(12) United States Patent
Berger

(10) Patent No.: US 7,677,218 B2
(45) Date of Patent: Mar. 16, 2010

(54) CYLINDER HEAD INCLUDING A STRESS SLOT WITH FILLER

(75) Inventor: Craig Mitchell Berger, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 169 days.

(21) Appl. No.: 11/882,243

(22) Filed: Jul. 31, 2007

(65) Prior Publication Data

US 2009/0033035 A1    Feb. 5, 2009

(51) Int. Cl.
*F02F 11/00* (2006.01)
(52) U.S. Cl. .................................. 123/193.5
(58) Field of Classification Search .......... 123/193.5, 123/193.3; 277/592
See application file for complete search history.

(56) References Cited

U.S. PATENT DOCUMENTS

| | | | |
|---|---|---|---|
| 3,942,487 A | | 3/1976 | Zink |
| 4,221,198 A | * | 9/1980 | McNair, Jr. ................. 123/285 |
| 4,369,980 A | | 1/1983 | Backlin |
| 4,436,066 A | | 3/1984 | Formia et al. |
| 4,561,388 A | | 12/1985 | Gwinner et al. |
| 4,561,406 A | * | 12/1985 | Ward ......................... 123/536 |
| 4,662,643 A | | 5/1987 | Rosenquist |
| 4,669,740 A | | 6/1987 | Schwenkel |
| 4,781,158 A | | 11/1988 | Bauer et al. |
| 4,781,389 A | | 11/1988 | Beyer et al. |
| 4,844,030 A | | 7/1989 | McAvoy |
| 4,892,069 A | | 1/1990 | Roesch et al. |
| 4,974,569 A | | 12/1990 | Ampferer et al. |
| 4,998,741 A | | 3/1991 | Udagawa |
| 5,033,189 A | | 7/1991 | Desverchere et al. |
| 5,267,740 A | | 12/1993 | Stritzke |
| 5,681,048 A | | 10/1997 | Tronel |
| 5,775,272 A | | 7/1998 | Matsunaga et al. |
| 5,803,462 A | | 9/1998 | Kozerski |
| 6,186,506 B1 | | 2/2001 | Kionoshita |
| 6,349,681 B1 | | 2/2002 | Li |
| 6,371,489 B1 | | 4/2002 | Combet et al. |
| 6,390,479 B1 | * | 5/2002 | Combet et al. ............. 277/594 |
| 6,527,277 B2 | | 3/2003 | Hegmann |
| 2006/0202431 A1 | * | 9/2006 | Breen ......................... 277/592 |

FOREIGN PATENT DOCUMENTS

| DE | 3723469 A | * | 1/1989 |
|---|---|---|---|
| DE | 03728530 | * | 3/1989 |

\* cited by examiner

*Primary Examiner*—M. McMahon
(74) *Attorney, Agent, or Firm*—Finnegan, Henderson, Farabow, Garrett & Dunner

(57) ABSTRACT

A seal for an engine is disclosed. The seal may include a cylinder head gasket. The seal may also include a cylinder head having a top surface and a bottom surface, the bottom surface of the cylinder head attached to the cylinder head gasket. The seal may also include a plurality of adjacent openings extending through the cylinder head, from the top to the bottom surface. The seal may further include one or more elongated slots in the bottom surface of the cylinder head, the one or more slots being located between at least two of the adjacent openings and extending between the openings. The seal may also include filler material filling each of the elongated slots.

20 Claims, 2 Drawing Sheets

CYLINDER HEAD INCLUDING A STRESS SLOT WITH FILLER

TECHNICAL FIELD

The present disclosure is directed to a cylinder head, and more particularly, to a cylinder head having stress slots filled with durable material.

BACKGROUND

Machines, including construction, on-highway, and agriculture vehicles, have a main power source for moving the machine, powering a tool, or driving other operations. The main power source usually includes an internal combustion engine, such as a diesel engine, a gasoline engine, a gaseous fuel-powered engine, or any other type of engine. These engines include pistons moving in cylinders causing combustion, the pistons being retained in an engine block. A cylinder head typically caps the engine block. The engine also typically includes a cylinder head gasket forming a seal between the cylinder head and the engine block. Each cylinder typically includes a fire ring providing a combustion seal. In resisting the force from engine combustion, transferred from the cylinders into the head, the cylinder head must resist very high stresses. Providing stress slots in the head between the cylinders is one technique for relieving this stress.

Providing stress slots in the cylinder head, though, creates a new problem. While providing flexibility for the head to expand or contract, thereby relieving stress, the stress slots simultaneously reduce the capacity of the cylinder head gasket for supporting the fire rings between cylinders. The stress slots allow for too much movement in the head gasket, which decreases support for the fire rings. When the cylinder head gasket extrudes into the slots, the fire rings take more stress than intended, resulting in a higher rate of fire ring blow-outs between the cylinders. Essentially, the problem of high stress in the cylinder head is mitigated at the expense of an increased rate of fire ring blow-outs. Since a higher rate of fire ring blow-outs has been considered tolerable in view of the advantage of stress relief in the cylinder head, the related problems of stress relief in the cylinder head and fire ring blow-outs have not been simultaneously solved.

One system for reinforcing a head gasket is disclosed in U.S. Pat. No. 4,998,741 (the '741 patent) issued to Udagawa on Mar. 12, 1991. The '741 patent discloses a cylinder head gasket comprising an upper plate, a middle plate, and a lower plate. The cylinder head gasket includes a plurality of holes corresponding to the cylinders of the engine. At least one dividing area is located on the cylinder head gasket between the cylinder holes, this area including a reinforcing bead along the longitudinal direction thereof. The reinforcing bead is provided on the upper plate of the cylinder head gasket to prevent creep relaxation of the upper plate.

Though the '741 patent provides a technique for preventing relaxation in the cylinder head, it does not adequately address the problem of stress relief. While preventing expansion and contraction, which may contribute to protecting against fire ring blow-out, the '741 patent overlooks the related problem of high stresses being attracted in the head by the reinforcing beads. A solution is required that simultaneously solves the related problems of high head stresses and fire ring blow-out, rather than mitigating one problem at the expense of worsening the other.

The cylinder head of the present disclosure solves the dual problems set forth above.

SUMMARY OF THE DISCLOSURE

In one exemplary aspect, the present disclosure is directed to a seal for an engine. The seal may include a cylinder head gasket. The seal may also include a cylinder head having a top surface and a bottom surface, the bottom surface of the cylinder head attached to the cylinder head gasket. The seal may also include a plurality of adjacent openings extending through the cylinder head, from the top to the bottom surface. The seal may further include one or more elongated slots in the bottom surface of the cylinder head, the one or more slots being located between at least two of the adjacent openings and extending between the openings. The seal may also include filler material filling each of the elongated slots.

In another aspect, the present disclosure is directed to a method of servicing an engine. The method may include providing a cylinder head having a top surface and a bottom surface, further including a plurality of adjacent openings extending through the cylinder head, from the top to the bottom surface. The method may further include providing one or more elongated slots in the bottom surface of the cylinder head, the one or more slots being located between at least two of the adjacent openings and extending between the openings. The method may also include filling each of the elongated slots with a filler material and securing the cylinder head to fit over cylinders of an engine with a cylinder head gasket between.

DETAILED DESCRIPTION

Figure 1:
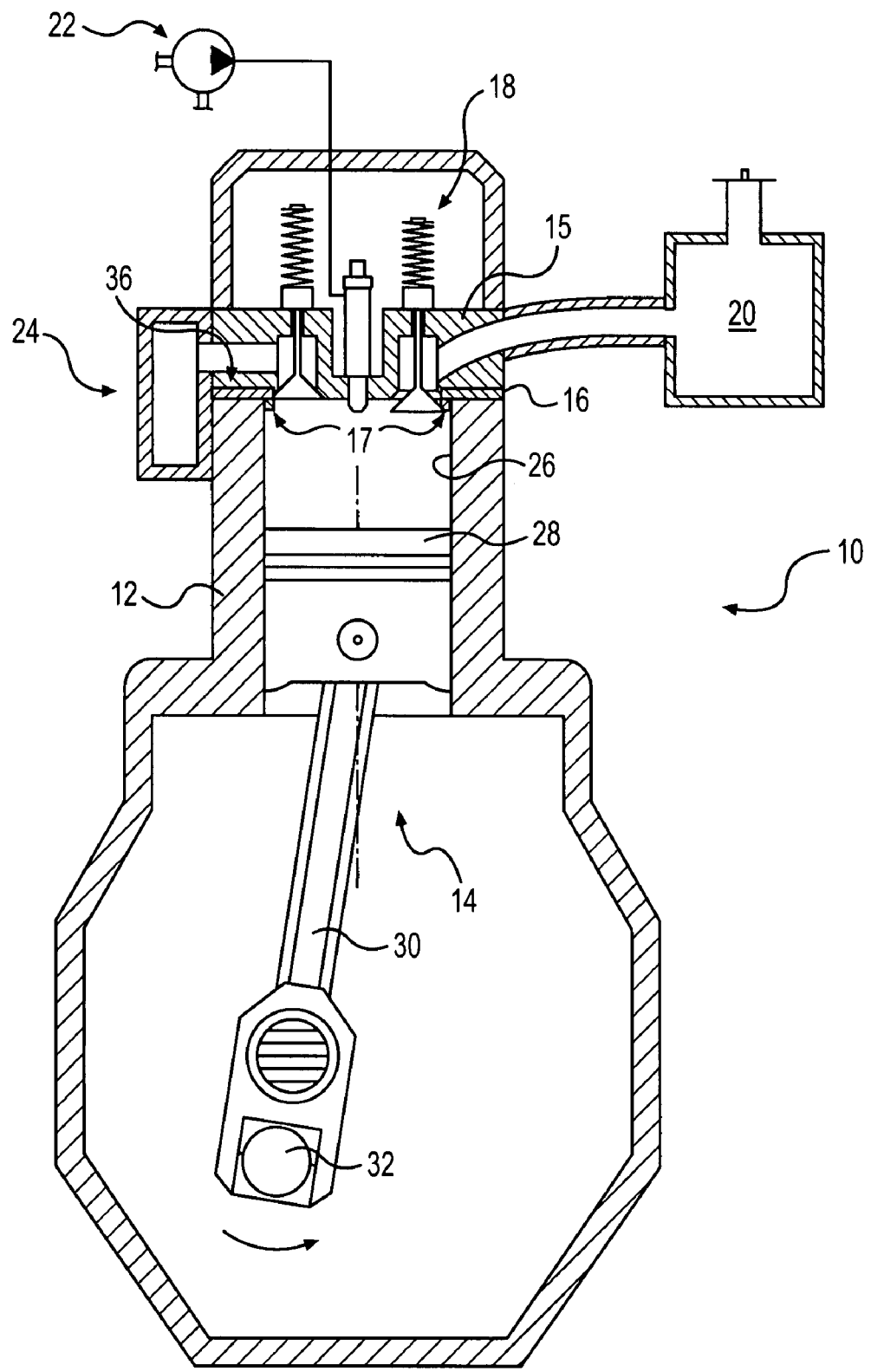
FIG. 1 is a cross-section of an exemplary disclosed engine.

An exemplary internal combustion engine 10 is illustrated in FIG. 1. Internal combustion engine 10 is depicted and described as a diesel engine. However, it is contemplated that internal combustion engine 10 may be any other type of internal combustion engine, such as, for example, a gasoline or natural gas engine. Internal combustion engine 10 may include an engine block 12, a plurality of piston assemblies 14 (only one shown), a cylinder head 15 associated with engine block 12, a valve actuation system 18, an air induction system 20, a fuel system 22, and an exhaust system 24. A cylinder head gasket 16 may be located on top of engine block 12, and may provide a sealed connection between engine block 12 and cylinder head 15.

Engine block 12 may be a central structural member defining a plurality of cylinders 26 (only one shown). Cylinders 26 may be sealed by cylinder head gasket 16 and fire rings 17. A piston assembly 14 may be slidably disposed within each of cylinders 26. It is contemplated that the internal combustion engine 10 may include any number of cylinders 26 and that the cylinders 26 may be disposed in an "in-line" configuration, a "V" configuration, or any other conventional configuration.

Piston assembly 14 may include a piston crown 28 pivotally connected to a connecting rod 30, which is in turn pivotally connected to a crankshaft 32. Crankshaft 32 of internal combustion engine 10 may be rotatably disposed within engine block 12 and each piston assembly 14 coupled to crankshaft 32 so that a sliding motion of each piston assembly 14 within each cylinder 26 results in a rotation of crankshaft 32, enabling crankshaft 32 to drive devices (not shown) associated with engine 10, such as wheels of a vehicle.

Figure 2:
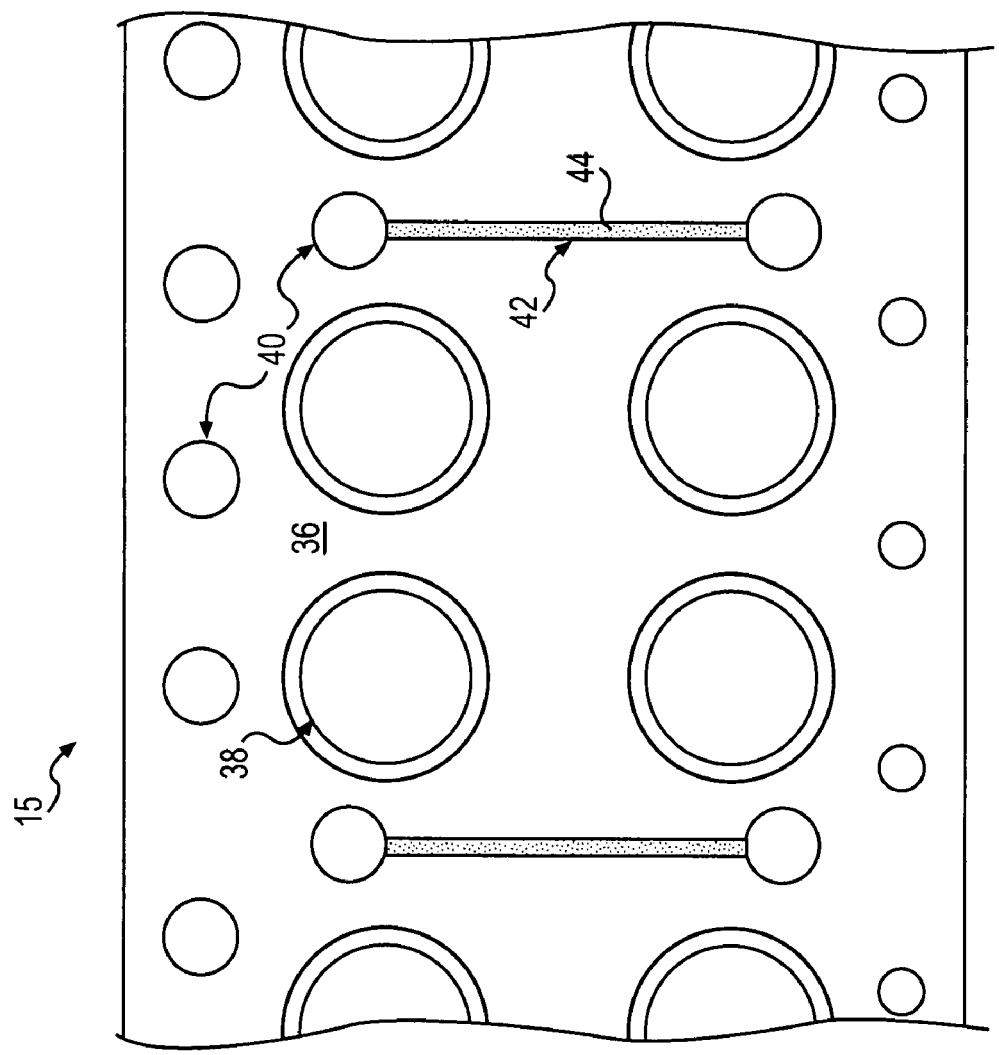
FIG. 2 is a diagrammatic representation of a bottom surface of an exemplary disclosed cylinder head for use with the engine of FIG. 1.

FIG. 2 shows a bottom surface 36 of exemplary cylinder head 15 in greater detail. Cylinder head gasket 16 may provide a sealed connection between engine block 12 and cylinder head 15. A plurality of openings 38 may extend through cylinder head 15, from a top surface of cylinder head 15 to a bottom surface of cylinder head 15. Cylinder head gasket 16 may be made from any suitable durable material known in the art for resisting combustion forces, including steel, aluminum, graphite, or kevlar. If made from graphite or kevlar, cylinder head gasket 16 may include steel mesh reinforcing in its center.

Fire rings 17 may be made from any durable material known in the art, such as iron. Fire rings 17 may serve to form a sealed connection between engine block 12 and cylinder head 15 adjacent to cylinders 26, and between cylinders 26 and cylinder head gasket 16. Combustion gases may push against fire ring 17, causing fire ring 17 to transfer combustion force into cylinder head gasket 16. Together, fire rings 17 and cylinder head gasket 16 may form a seal for engine 10 between engine block 12 and cylinder head 15.

Cylinder head 15 may include a plurality of holes 40 for receiving a plurality of fasteners (not shown) for mounting cylinder head 15 to engine block 12. Bottom surface 36 of cylinder head 15 may face toward engine block 12 and may be attached to cylinder head gasket 16.

Cylinder head 15 may include a plurality of stress slots 42. Stress slots 42 may be elongated openings located in bottom surface 36 of cylinder head 15. Stress slots 42 may extend between adjacent openings 38, as shown in FIG. 2. Stress slots 42 may extend only partially through cylinder head 15. Stress slots 42 may allow some expansion and contraction of cylinder head 15 in order to relieve high stresses within cylinder head 15 resulting from engine combustion.

Stress slots 42 may be filled with filler material 44. Filler material 44 may be any durable filler material known in the art that can suitably withstand temperatures associated with engine combustion, such as ceramic filler. Filler material 44 may reinforce the capacity of cylinder head 15 at stress slots 42 (to prevent excessive extrusion), while still allowing some expansion and contraction at stress slots 42 (to relieve stresses in cylinder head 15). Stress slots 42 may be partially or completely filled with filler material 44. If stress slots 42 are completely filled, filler material 44 may be finished so that a top surface of filler material 44 is flush and even with bottom surface 36 of cylinder head 15.

INDUSTRIAL APPLICABILITY

The disclosed stress slots and filler material may provide a means for simultaneously relieving stresses and preventing fire ring blow-outs from cylinder heads. The disclosed stress slots and filler material may allow some expansion and contraction in the cylinder head, relieving high stresses associated with combustion. The filler material may also increase the capacity of the cylinder head to prevent excessive extrusion and fire ring blow-outs. Preventing these problems reduces maintenance and service costs associated with internal combustion engines.

The operation of cylinder head 15 of engine 10 will now be described. Before combustion occurs in engine 10, cylinder head gasket 16 may be fixedly secured between engine block 12 and cylinder head 15. Combustion in cylinders 26 may exert force into fire rings 17, causing fire rings 17 to push out against cylinder head 15. Cylinder head 15 may absorb the force, inducing high stresses and causing cylinder head 15 to deflect.

Stress slots 42, filled with filler material 44, may allow the high stresses from combustion in cylinder head 15 to be relieved. Stress slots 42 and filler material 44 may allow enough movement for cylinder head 15 to slightly expand or contract, thereby relieving stresses. Though allowing some movement, filler material 44 may also provide capacity at stress slots 42 to prevent excessive deflection of cylinder head 15. Without excessive head deflection, fire rings 17 may remain adequately supported by cylinder head gasket 16, reducing the likelihood of fire rings 17 being blown out by combustion forces.

Stress slots 42 and filler material 44 together may simultaneously allow for relief of high combustion stresses in cylinder head 15 while providing adequate capacity to prevent blow-out of fire rings 17. By simultaneously reducing the number of cylinder head gasket stress failures and fire ring blow-outs, engine repair costs may be substantially reduced.

It will be apparent to those skilled in the art that various modifications and variations can be made to the disclosed cylinder head. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A seal for an engine, comprising:
    a cylinder head gasket;
    a cylinder head having a top surface and a bottom surface, the bottom surface of the cylinder head attached to the cylinder head gasket;
    a plurality of adjacent openings extending through the cylinder head, from the top to the bottom surface;
    one or more elongated slots in the bottom surface of the cylinder head, the one or more slots being located between at least two of the adjacent openings, the one or more slots extending between the openings; and
    filler material filling each of the elongated slots.

2. The seal of claim 1, wherein the cylinder head gasket is made from graphite.

3. The seal of claim 1, wherein the cylinder head gasket is made from kevlar.

4. The seal of claim 1, wherein the center of the cylinder head gasket includes steel mesh reinforcing.

5. The seal of claim 1, wherein the filler material is ceramic.

6. The seal of claim 1, wherein the filler material entirely fills each of the elongated slots.

7. The seal of claim 6, wherein the filler material is finished so that a top surface of the filler material is flush with the bottom surface of the cylinder head.

8. The seal of claim 1, wherein the bottom surface of the cylinder head faces engine combustion.

9. The seal of claim 1, further including a plurality of fire rings.

10. The seal of claim 9, wherein each of the plurality of fire rings is located adjacent to and aligned with each of the plurality of openings.

11. The seal of claim 9, wherein the plurality of fire rings are made from iron.

12. A method of servicing an engine, comprising:
    providing a cylinder head having a top surface and a bottom surface, further including a plurality of adjacent openings extending through the cylinder head, from the top to the bottom surface;

providing one or more elongated slots in the bottom surface of the cylinder head, the one or more slots being located between at least two of the adjacent openings, the one or more slots extending between the openings;

filling each of the elongated slots with a filler material; and securing the cylinder head to fit over one or more cylinders of the engine with a cylinder head gasket between.

13. The method of claim 12, wherein the cylinder head gasket is made from graphite.

14. The method of claim 12, wherein the cylinder head gasket is made from kevlar.

15. The method of claim 12, wherein the center of the cylinder head gasket includes steel mesh reinforcing.

16. The method of claim 12, wherein the filler material is ceramic.

17. The method of claim 12, wherein the filler material entirely fills each of the elongated slots.

18. The method of claim 17, wherein the filler material is finished so that a top surface of the filler material is flush with the bottom surface of the cylinder head.

19. The method of claim 12, wherein the bottom surface of the cylinder head faces engine combustion.

20. A combustion engine, comprising:

an engine block including a plurality of cylinders;

a cylinder head;

a plurality of fasteners for mounting a cylinder head gasket between the engine block and the cylinder head; and the cylinder head including:

a top surface;

a bottom surface;

a plurality of adjacent openings extending through the cylinder head, from the top to the bottom surface;

one or more elongated slots in the bottom surface of the cylinder head, the one or more slots being located between at least two of the adjacent openings, the one or more slots extending between the openings; and filler material filling each of the elongated slots.

* * * * *